(12) United States Patent
Kohn

(10) Patent No.: US 8,922,798 B2
(45) Date of Patent: Dec. 30, 2014

(54) STORAGE MEDIUM AND METHOD FOR PRODUCING A PRINTED PRODUCT

(75) Inventor: Michael Kohn, Neumuenster (DE)

(73) Assignee: Heidelberger Druckmaschinen AG, Heidelberger (DE)

( * ) Notice: Subject to any disclaimer, the term of this patent is extended or adjusted under 35 U.S.C. 154(b) by 112 days.

(21) Appl. No.: 13/600,553

(22) Filed: Aug. 31, 2012

(65) Prior Publication Data

US 2013/0057892 A1    Mar. 7, 2013

(30) Foreign Application Priority Data

Sep. 1, 2011   (DE) .......................... 10 2011 112 076

(51) Int. Cl.
*G06F 3/12*     (2006.01)
*G06K 15/00*    (2006.01)
*G06F 17/22*    (2006.01)

(52) U.S. Cl.
CPC ............ *G06F 3/1212* (2013.01); *G06F 3/1282* (2013.01); *G06F 3/1215* (2013.01); *G06F 3/1245* (2013.01); *G06F 3/1246* (2013.01); *G06F 3/122* (2013.01); *G06F 17/2247* (2013.01); *G06F 3/1253* (2013.01); *G06F 17/227* (2013.01)
USPC ........ 358/1.13; 358/1.15; 358/1.16; 358/1.18

(58) Field of Classification Search
USPC ............... 358/1.15, 1.13, 1.18, 1.16, 1.9, 2.1, 358/468, 501, 508, 523, 539, 540; 714/200, 714/251, 252, 253, 273, 274, 276, 277, 513, 714/700
See application file for complete search history.

(56) References Cited

U.S. PATENT DOCUMENTS

| 6,407,821 | B1  |   | 6/2002  | Hohensee et al. |
| 2003/0107766 | A1 | * | 6/2003  | Ramot et al. ................. 358/1.18 |
| 2004/0193465 | A1 | * | 9/2004  | Sangroniz et al. ................ 705/8 |
| 2006/0238803 | A1 | * | 10/2006 | Kuroshima .................. 358/1.15 |

FOREIGN PATENT DOCUMENTS

DE    10 2007 036 985 B4    12/2010

OTHER PUBLICATIONS

German Patent and Trademark Office Search Report, Dated April 24, 2012.

* cited by examiner

*Primary Examiner* — Ngon Nguyen
(74) *Attorney, Agent, or Firm* — Laurence A. Greenberg; Werner H. Stemer; Ralph E. Locher

(57) ABSTRACT

In a method for creating a printed product, JDF files are converted into a DOM tree to represent the files in a representation in a main memory of a computer. The conversion, as well as individual processing steps, is time-consuming. To accelerate the encoding and processing steps, a method is performed wherein a file in a first data format is stored in a memory, the file contains information for creating the printed product. The file is decoded into a representation in the main memory. The first data format includes two memory areas, a first memory area contains attributes for method steps to be implemented and/or for materials of the printing process and/ or of the printed product. The representation is included in the two memory areas, and the data of a first memory area of the representation are essentially identical with the data of the first memory area of the file.

9 Claims, No Drawings

STORAGE MEDIUM AND METHOD FOR PRODUCING A PRINTED PRODUCT

CROSS-REFERENCE TO RELATED APPLICATION

This application claims the priority, under 35 U.S.C. §119, of German application DE 10 2011 112 076.2, filed Sep. 1, 2011; the prior application is herewith incorporated by reference in its entirety.

BACKGROUND OF THE INVENTION

Field of the Invention

The present invention relates to a method for producing a printed product containing the steps of storing at least one file in a first data format. The file includes at least information pertaining to the method for producing the printed product. The file is decoded into a representation in a main memory of a computer. At least one operation is applied to the representation in the main memory to change the data of the representation in the main memory. The data of the data format is encoded from the data of the representation. The method further includes adapting the printed product, a processed or treated version of the printed product or a processed or treated version of the original based on the data that have thus been changed, and finally creating a printed product using the adaptation.

In the graphic industry, at least one respective data set is created to produce a printed product. The data set may in particular include an original for the printed product itself. The data set is stored in a markup language ML such as XML. A modern workflow for producing a printed product relies on a special markup language and the corresponding data format JDF. This particular markup language is very common in the graphic industry and has been standardized by the CIP 4 Organization.

Within this data format, the parameters that describe the individual process steps to be carried out on the printed product are stored at locations that have been predetermined for the purpose. To produce the printed product, the file is subsequently forwarded to further processing stations for instance by a management information system (MIS). The further processing stations may for instance be a plate setting device in the prepress department, the press itself, or folding devices provided downstream of the printing press. The JDF data format permits the MIS to forward the corresponding information in a star-like manner to the individual work stations and also the individual work stations themselves to exchange the information.

Computers that have a main memory into which these files are decoded in the form of a representation are provided at the MIS or at the individual work stations.

To process the files in the computers, the data are either accessed at a central network memory or at a local memory of the computer itself or they are forwarded to the computer.

In the process, the XML data, i.e. the JDF, are stored as a file. Using various interfaces, protocols or programs, these data may be read, i.e. decoded, into the main memory of the computer. For this purpose, processes or APIs such as SAX (Simple API for XML), StAX (Streaming API for XML) or DOM parsers (Document Object Model) may be used.

It is possible to gather information from the XML or to create an object model in an object-oriented programming language such as JAVA in the main memory. "JAVA" (US Registration Number 2178784 is a registered trademark of Oracle America, Inc.

Methods for compressing and decompressing data to reduce the size of XML or JDF files are known in the art. Among these are Fast Infoset and EFFICIENT XML (EXI). In accordance with these methods, elements from the XML are stored in their existing sequence. These elements include nodes, attributes, texts, comments, namespaces, and control characters. These individual elements are then compressed using known methods. In the compression process, one or more dictionaries are used to store the clear text of the stored individual components separately from the actual information. Further options that do not specialize in XML files are common file compressing methods as they are used by programs such as GZIP (GNU-ZIP), for example.

To be able to create a representation of the XML or JDF files in the main memory of a computer in a method for producing a printed product, these files in general need to be converted into a DOM tree in one of the ways described above before they can be processed any further. This conversion takes time and the DOM tree requires a lot of memory space. Moreover, the individual processing steps based on the DOM tree are carried out comparatively slowly. Thus to the user, the processing of the XML data within the representation in the main memory of the computer seems to be very slow. In particular, the decoding process by means of the known APIs and methods is very time-consuming.

This time-consuming process prolongs the time it takes until the production of a printed product or an original or a printed printing material can be started.

SUMMARY OF THE INVENTION

It is accordingly an object of the invention to provide a storage medium and a method for producing a printed product which overcome the above-mentioned disadvantages of the prior art methods and devices of this general type.

The object is attained by a method for creating a printed product as described in the claims.

In accordance with the method of the invention, initially a file in a first data format is stored in a memory. The memory is a non-volatile memory such as a hard disk storage unit. Alternatively, it may be a data stream if the file is sent to the computer from a remote computer or memory.

The file at least contains information on the method for creating the printed product. The information may relate to the print sheets that are used, the inks to be used, and to the further processing steps to be carried out on the printed printing material.

In accordance with the method, the file is decoded into a representation in a main memory of a computer. The data format of this file has at least two memory areas, a first one of which contains attributes for the process steps to be used or carried out and/or for materials of the printing process and/or about the printed product itself.

In accordance with the invention, the representation in the main memory likewise is to include at least two memory areas, with at least the data of a first memory area of the representation being essentially identical with the data of at least the first memory area of the file of the first data format in the memory.

At least one operation is applied to the data of the representation in the main memory. Subsequently, depending on this operation, the data of the representation in the main memory are then modified. Based on these modified data of the representation, a file is re-encoded in the first data format.

The operation may relate to changes to the number of products, to the printing material to be used, to the folding pattern, to the layout, or to similar changes.

These modified data of the first file format are forwarded to at least one processing device for processing or treating printed products or originals in a data stream, for example via an intranet or the internet, or by intermediately storing the file itself on a data carrier or a server.

Based on the modified data, the printed product, the processed version of the printed product, or the further treated version of the printed product itself or, alternatively, of the original is adapted. Finally a finished printed product is produced using this adaptation.

By providing information in a first memory area of the file of the first data format in a form that is essentially identical with the way in which this information is stored in the first memory area of the representation, at least for this first memory area a time-consuming conversion may be dispensed with. Thus the entire file can be decoded much faster.

To take this step, it is necessary to deviate at least in areas, i.e. at least in the first memory area, from the specifications of XML, at least, however, from the specifications of the JDF, i.e. from the guidelines of the CIP4 specifications.

In accordance with a further development, to simplify the processing of the file, i.e. of the representation of the file in the main memory, the essentially identical first memory areas at least have the same nodes and attribute indexes.

Since in accordance with the method, at least in the essentially identical memory areas the data are not converted when the data of the first data format are read into the main memory, the decoding speed can be increased.

In accordance with a further development, the digital representations of the data of the first memory area of the first data format and of the representation in the main memory are read and written from the first data format into the representation in the main memory or vice versa in a in a bit-by-bit identical way in order to ensure that the data of the first data format are read into the main memory as efficiently and as quickly as possible.

In accordance with an additional feature, in order to be able as quickly as possible to convert or decode even information that cannot be stored essentially identically in the first memory area, at least one second memory area of the first data format may be provided. In this second memory area, the data are organized in the same structure as in a second memory area of the representation in the main memory. In addition, a third memory area of the first data format or of the representation or of both may be provided. The third memory area may contain a dictionary for converting binary attribute data of the data format in order to convert binary attribute data of the second memory area of the first data format into objects of a higher programming language of the second memory area of the representation by use of the dictionary. The data in the second memory area are not digitally stored in a bit-by-bit identical way. Instead, they need to be converted; the dictionary makes the conversion possible.

In this manner, it is possible to quickly decode even further attribute data, in particular data that are summarized in a dictionary that can only be made available in the representation of the main memory as objects of a higher programming language.

Advantageously, only individual values of the second memory area of the first data format are to be replaced by strings of the dictionary of the third memory area. As for the rest, the structures of the second memory areas of the first data format and of the representation in the main memory are to be identical. Thus the required decoding steps can be reduced.

In accordance with a preferred embodiment, the first data format is preferably generated out of an XML dialect, preferably a JDF format. Such JDF formats are a common and preferred format for workflows for the creation of printed products.

In accordance with the method, the data of a corresponding JDF file or of a file in an XML dialect are then converted into a representation in the main memory of a first computer, with a first memory area of the representation being structured in a way to be bit-by-bit identical with the data of the first data format and the first data format being encoded by copying at least the first memory area of the representation bit by bit into a first memory area of the first data format. The conversion is essentially a copying process. The simple copying of bits from one memory area of the main memory into a memory area of another memory does not require any time for conversion, i.e. for encoding or decoding the correspondingly stored data. The first data format is generally different from the JDF file or from the other file in an XML dialect. Due to the conversion of the JDF file or of the XML file, the representation is created for the first time in the main memory and due to the bit-by-bit identical structure of the first memory area of the first file format, this first file format is generated for the first time in the first computer based on the JDF or XML file. Further on in the workflow, the first data format having the aforementioned advantages will then be used. For this purpose, however, a considerable deviation from the JDF specifications is required, a fact which is prepared to accept because of the advantages.

An even faster encoding or decoding of the entire file of the first data format into the representation in the main memory or vice versa may be attained by storing redundant attribute maps of the JDF file only once in a first or second memory area of the representation in the main memory and by referencing them using a dictionary in the third memory area of the representation. Preferably, this is done exclusively to resolve redundancies of the attribute maps.

Moreover, the first data format or rather a file of the first data format may be forwarded to a second computer using a network or a storage medium and these data of the first data format may be decoded into a representation in the main memory of the second computer and at least the data of the first memory area may be copied bit-by-bit identically into a first memory area of the representation in the main memory of the second computer or, alternatively, based on the first data format, a representation may be re-generated in the main memory of the first computer instead of transferring these data to a second computer, with at least the data of the first memory area of the first data format being copied in a bit-by-bit identical way into a first memory area of the representation. Then operations are subsequently applied to the data of the respective representation in the main memory of the first or second computer, and, taking these operations into account, a printed product is created or at least manipulated by a printing press, a prepress device, or a further processing device. In the process, the identity of memory areas of the representation in the main memory and of the first data format may advantageously be exploited in several method steps on the same or on different computers in order to be able to make manipulations on the computer more quickly or to make the corresponding data available in the computer and thus more easily and more quickly to create a manipulated printed product.

Moreover, the invention relates to a corresponding storage medium with a computer program for implementing one of the methods in accordance with at least one of the aforementioned method steps.

Further features of the invention may become apparent from the following description of one example of the method of the invention, which is given by way of example only and is not intended to limit the scope of the invention in any way.

Initially, a first file is created in a first computer, which may be part of a Management Information System (MIS). In a first step of the method, this file may be transformed on the computer into a representation in the main memory of the computer. In a subsequent second step, after appropriate processing, the representation in the main memory may be re-transformed back into the corresponding first data format if desired. In this way, a file in the first data format may be generated for the first time if the initial file has been created in an XML dialect or in the JDF format.

The first data format is roughly structured as follows; i.e. it contains the following sections:

| |
|---|
| Header |
| Node |
| Attribute indexes |
| Attribute table |
| String table |

The individual sections will be described in detail below:
The header consists of the following entries:

| |
|---|
| Unique format identifier |
| Version identifier |
| Author identifier |
| Size of the node area |
| Size of the attribute table |
| Size of the string table |
| Format variant identifier |

The format identifier is a unique byte sequence allowing a computer program to recognize the first data format as such.

The version identifier defines the version of the first data format. A typical example would be "1.0.0.0". The identifier is intended as a means of integrating improvements to the first data format in the course of time. A computer program that reads a file in this first data format may evaluate the version identifier to be able to read both old and new versions of the first data format.

The author identifier is an individual identifier of the software or of the organization that created the file of the first data format.

The size of the "node", "attribute table" and "string table" sections is given in the number of bytes.

The format variant consists of a set of bits, each of which identifies a special type of the first data format. The following types exist:

| | |
|---|---|
| Bit 0 | Compressed or non-compressed |
| Bit 1 | Identifier for the number of bits per node |
| Bit 2 | |
| Bit 3 | Identifier for the number of bits per attribute index |
| Bit 4 | |
| Bit 5 | Identifier for the number of bits per string index |
| Bit 6 | |

Bit 0 indicates whether the data after the header are compressed or not. If they are, they have been compressed in accordance with the known "gzip" method. Thus before the actual content can be read, the data need to be decompressed. The header itself will never be compressed!

Bits 1 to 6 indicate the width of the elements of the individual sections.

The default value is 16 bits per individual element.

The structure of the node area is now described.

If n is the number of nodes in the XML or JDF document, the nodes are stored as a sequence of n bit patterns of identical size:

| 0 | 1 | ... | n − 2 | n − 1 |
|---|---|---|---|---|

Each node is stored as a sequence of m bits, m being identical for all nodes and resulting from the header. Normally, m will be 16. The sequence of nodes corresponds to the sequence of nodes in the corresponding XML file. The m bits have the following meaning:

| 0 | 1 | 2 to m − 1 |
|---|---|---|

Bit 0 indicates whether or not it is the first child element.
Bit 1 indicates whether or not it is the last child element.
The remaining bits either form an index in the string table or include the identifier for a comment or a text element. If bits 2 to m-1 form the value 0×3FFF, it is a text node. If bits 2 to m-1 form the value 0×3FFE, it is a comment node. Otherwise the bits form an index for the node section in the string table.

The structure of the attribute index area is now described.

Like the node area, this area consists of a sequence of n bit patterns of equal size. n is the number of nodes. Thus for every node there is an attribute index.

| 0 | 1 | ... | n − 2 | n − 1 |
|---|---|---|---|---|

Each index is stored as a sequence of m bits. m is identical for all indexes. It is apparent from the header and is normally 16. The m bits form an index that has the following meaning depending on the node type:

If it is a text or comment node, the index points to a string in the section of general strings in the string table. Otherwise the index points to an AttributeMap in the attribute table.

An AttributeMap is the entirety of the attributes of an XML node.

Other features which are considered as characteristic for the invention are set forth in the appended claims.

Although the invention is described herein as embodied in a storage medium and a method for producing a printed product, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DETAILED DESCRIPTION OF THE INVENTION

Examples

<Color    CMYK="0.27    0.00    0.38    0.00" ColorType="Normal" Name="PANTONE 358 C" />

"PANTONE"(US Registrarion Number 926076 ) is a registered trademark of PANTONE LLC.

The node named "color" has the three attributes "CMYK", "ColorType" and "Name". These attributes have the following values:
CMYK="0.27 0.00 0.38 0.00"
ColorType="Normal"
Name="PANTONE 358 C"

The set of attributes and the associated values forms the AttributeMap.

The structure of the attribute table is now described.

If p is the number of AttributeMaps, the AttributeMaps are successively stored as p data sets.

| 0 | 1 | 2 | ... | p − 2 | p − 1 |
|---|---|---|-----|-------|-------|

The size of the memory area per AttributeMap results from the size of the AttributeMap.

In contrast to the nodes and attribute indexes, the size of an individual data set is variable. Thus a direct jump to the data set using the index is not possible. To get to the AttributeMap by an attribute index, the AttributeMaps need to be read, i.e. interpreted in advance. Not every node has an AttributeMap. Several nodes may refer to the same AttributeMap. There are nodes without an AttributeMap. If q is the number of attributes of an individual AttributeMap, the structure is as follows:

| Number of attributes | Flag | Attribute 0 | Attribute 1 | ... | Attribute q − 1 |
|---|---|---|---|---|---|

The size of the flag is one bit. The flag indicates whether or not the AttributeMap is used multiple times. Each attribute consists of the following:

| Index of the attribute name | Index of the attribute value |
|---|---|

The size of the indexes is defined in the header. Normally it is 16 bits. The index of the attribute name points to an entry in the attribute name section of the string table. The index of the attribute value points to an entry in the general section of the string table.

The structure of the string table is now described.

The string table consists of a header and of three sections:

| Table header |
|---|
| Node name |
| Attribute names |
| General strings |

The header consists of three integer values, which respectively define the number of strings per section.

| Number of node name strings | Number of attribute name strings | Number of general strings |
|---|---|---|

The strings are stored in the UTF-8 format.

Representations in the memory of a computer are now described.

Initially, a representation for the first data format is generated in the main memory. This representation is referred to as a data format of the BJFDocument class for a binary JDF document. The following paragraphs describe how a BJDF-Document is created from a JDF file or an XML file and is subsequently stored as a file in the first data format."JDF"(US Registration Number 3833366 is a registered trademark of International Cooperation for the Integration of Processes in Prepress, Press and Postpress Organization.

Description of the "BJDFDocument" class in UML notation:

| BJDFDocument |
|---|
| m_ElementBuffer : short[*] |
| m_AttrIndexBuffer : int[*] |
| m_AttributeBuffer : AttributeData[*] |
| m_Dictionary : Dictionary |
| m_ChildrenMap : IntList[*] |
| getAttributeData( nElementIndex : int ) : AttributeData |
| setAttributeData( nElementIndex : int,data : AttributeData ) |
| getNodeName( nElementIndex : int ) : String |
| insertNode( nElementIndex : int ) |
| deleteNode( nElementIndex : int ) |
| getTexts( nElementIndex : int ) : String[*] |
| getComments( nElementIndex : int ) : String[*] |
| getNumElements( ) : int |
| getChildren( nElementIndex : int) : IntList |

The attributes "m_ElementBuffer" and "m_Attrindex-Buffer" contain exactly the nodes and attribute indexes from the file of the first data format. This file is practically a binary XML file.

"m_AttributeBuffer" contains the AttributeMaps, each of which is represented by the "AttributeData" Java class.

"m_Dictionary" contains the string table, i.e. the dictionary.

"m_ChildrenMap" is the cache of the child elements and is generated from "m_ElementBuffer". The information in "m_ChildrenMap" are thus redundant and are only used for quick access.

The methods of "BJDFDocument" indicate that all important operations on the data are possible. The given example only has minimum functionality. A genuine implementation for practical use will provide many more methods. The implementation details are not explained in any detail herein. Using the information given above, the implementation ought not to be a problem for those skilled in the art.

The following paragraphs describe how the data of the binary XML data, i.e. the data of the first data format, are read and transferred into a BJDFDocument, i.e. into a representation in the main memory of a computer.

The structure of the data in the "BJDFDocument" class is very similar to the structure in the first data format. "m_ElementBuffer" and "m_AttrIndexBuffer" contain the data in the same form as in the file in the first data format that has been stored/is to be stored. These data are imported without conversion. "m_AttributeBuffer" and "m_Dictionary" contain the data in the same structure as in the stored format. Only the individual values of "m_AttributeBuffer" respectively need to be decoded and converted into objects of a higher programming language. For this purpose, each of the codes from the binary format is replaced with the strings from the dictionary.

In this manner, a corresponding representation of the data in the first data format is created in the main memory. The representation is very similar to the first data format. The BJDFDocument assumes the role of the DOM tree in a conventional system. As the structure of the first data format does not differ greatly from that of the representation in the main memory, extremely fast reading and writing of the data are possible. The nodes and the attribute indexes are taken 1 to 1 from the file and do not need to be decoded; since these data make up for 30% of the data in the binary file, this means that 30% of the data need not be decoded when being read and need not be encoded when being written. Only the rest needs to be transformed.

Furthermore, the AttributeMaps as a whole are stored in a separate area. Thus it is possible to store duplicates of entire AttributeMaps only once instead of adding them again and again to the data stream. A conventional "Main-JDF" usually contains duplicates of entire AttributeMaps. Each of these is then only stored once. The node then only includes a respective reference to this location in the data stream.

To permit fast processing, a provision is made for providing each AttributeMap with information on whether it is used multiple times. When the document is edited, based on this information, a suitable software program can quickly determine whether or not an AttributeMap needs to be copied before changes are made. The AttributeMaps may then be made available in the cache memory.

In this way, fast processing of the binary data format, i.e. of the BJDFDocument in the main memory is possible. The file format is quickly transformed into the main memory and re-transformed back into the actual memory much more quickly than was known before. Thus based exclusively on this data format and the associated information, a printed product can subsequently be created, for instance by imaging a printing form in a platesetter.

The invention claimed is:

1. A method for creating a printed product, which comprises the following steps executed by a computer:
storing at least one file in a first data format in a memory, the file at least containing information for the method for creating the printed product, the first data format included in at least two memory areas, a first memory area of the at least two memory areas containing attributes for method steps to be carried out and/or for materials of a printing process and/or of the printed product;
decoding the file into a representation in a main memory of a computer, the representation included in at least two memory areas, data of a first memory area of the representation being essentially identical with data of the first memory area of the file of the first data format by at least having same nodes and attribute indexes;
applying at least one operation to data of the representation in the main memory, depending on the operation, data of the representation are changed;
encoding the data of the first data format from the data of the representation;
transmitting the data of the first data format as a further file or data stream to at least one processing device for processing or treating printed products or originals;
adapting the printed product, a processed or treated version of the printed product, or a processed/treated version of the original, based on the data that have thus been changed; and
creating the printed product using the adaptation.

2. The method according to claim 1, which further comprises:
providing at least one second memory area of the first data format;
providing the data in the second memory area in a same structure as in a second memory area of the representation in the main memory;
providing at least one third memory area of the first data format and/or of the representation, the third memory area contains a dictionary for converting binary attribute data of the first data format; and
converting the binary attribute data of the second memory area of the first data format into objects of a higher programming language of the second memory area of the representation using the dictionary.

3. The method according to claim 2, which further comprises replacing only individual values of the second memory area of the first data format by strings of the dictionary of the third memory area and for a rest the structures of the second memory areas of the first data format and of the representation in the main memory are identical.

4. The method according to claim 2, which further comprises:
generating the first data format from an XML dialect or a JDF format;
converting data of a corresponding JDF file or of a file in the XML dialect into the representation in the main memory of a first computer;
structuring the first memory area of the representation to be bit-by-bit identical with the data of the first data format; and
encoding the first data format by copying at least the first memory area of the representation bit by bit identically into the first memory area of the first data format.

5. The method according to claim 4, which further comprises storing redundant AttributeMaps of the JDF file only once in the first or second memory area of the representation in the main memory and are referenced using the dictionary in the third memory area of the representation, including exclusively resolving redundancies of the AttributeMaps.

6. The method according to claim 4, which further comprises:
transferring the data in the first data format to a second computer using a network or storage medium;
decoding the data of the first data format into the representation in a main memory of the second computer, in the process copying at least the data of the first memory area into the first memory area of the representation in the main memory of the second computer in a bit-by-bit identical way, or, wherein,
based on the first data format, representations are again created in the main memory of the first computer, copying at least the data of the first memory area of the first data format into the first memory area of the representation in a bit-by-bit identical way;
applying operations to the data of the respective representation in the main memory of the first or second computer; and
taking into account the operations, the printed product is created or manipulated using a printing press, a prepress device, or a further processing device.

7. A method for creating a printed product, which comprises the following steps executed by a computer:
storing at least one file in a first data format in a memory, the file at least containing information for the method for creating the printed product, the first data format included in at least two memory areas, a first memory area of the at least two memory areas containing attributes for method steps to be carried out and/or for materials of a printing process and/or of the printed product;
decoding the file into a representation in a main memory of a computer, the representation included in at least two memory areas, data of a first memory area of the representation being essentially identical with data of the first memory area of the file of the first data format the essentially identical first memory areas including respective data in identical form and wherein the data in the essentially identical first memory areas are not converted when the data of the first data format are imported into the main memory;

applying at least one operation to data of the representation in the main memory, depending on the operation, data of the representation are changed;

encoding the data of the first data format from the data of the representation;

transmitting the data of the first data format as a further file or data stream to at least one processing device for processing or treating printed products or originals;

adapting the printed product, a processed or treated version of the printed product, or a processed/treated version of the original, based on the data that have thus been changed; and creating the printed product using the adaptation.

8. The method according to claim 7, wherein digital representations of the data of the first memory areas of the first data format and of the representation in the main memory are read and written in a bit-by-bit identical way from the first data format into the representation and vice versa.

9. A non-transitory storage medium having computer-executable instructions for performing a method for creating a printed product, which comprises the following steps to be executed by a computer:

storing at least one file in a first data format in a memory, the file at least containing information for the method for creating the printed product, the first data format included in at least two memory areas, a first memory area of the at least two memory areas containing attributes for method steps to be carried out and/or for materials of a printing process and/or of the printed product;

decoding the file into a representation in a main memory of a computer, the representation included in at least two memory areas, data of a first memory area of the representation being essentially identical with data of the first memory area of the file of the first data format by at least having same nodes and attribute indexes;

applying at least one operation to data of the representation in the main memory, depending on an operation, data of the representation are changed;

encoding the data of the first data format from the data of the representation;

transmitting the data of the first data format as a further file or data stream to at least one processing device for processing or treating printed products or originals;

adapting the printed product, a processed or treated version of the printed product, or a processed/treated version of the original, based on the data that have thus been changed; and creating the printed product using the adaptation.

* * * * *